June 14, 1960     J. D. SULLIVAN     2,940,865
METHOD OF APPLYING A GLASS COATING TO STEEL BY USING
AN INTERMEDIATE LAYER OF NICKELOUS OXIDE
Filed Oct. 14, 1957

*INVENTOR.*
JAMES D. SULLIVAN

BY

Attorneys

2,940,865
METHOD OF APPLYING A GLASS COATING TO STEEL BY USING AN INTERMEDIATE LAYER OF NICKELOUS OXIDE

James D. Sullivan, Milwaukee, Wis., assignor to A. O. Smith Corporation, Milwaukee, Wis., a corporation of New York Filed Oct. 14, 1957, Ser. No. 689,995

5 Claims. (Cl. 117—23)

This invention relates to a method of glass coating steel and more particularly to a method of bonding glass coatings to steel by the use of a nickelous oxide coating that is applied to the steel base prior to glassing.

In the past, white or light colored glass coatings have not been successfully applied as a single coat directly to carbon steel because of the lack of adherence between the coating and the steel and due to the formation of hydrogen defects in the coatings which occur during firing of the glass to the steel at elevated temperatures and upon cooling the glass from the elevated temperature. To increase the adherence between the glass and the steel, an adherence promoter, such as cobalt oxide, can be added to the glass. However, the cobalt oxide adherence promoter cannot satisfactorily be added to white or light colored glass coatings for the cobalt oxide has a dark blue color which destroys the light color of the glass. Furthermore, the cobalt oxide will not act to overcome the hydrogen defects which occur in the coating. Therefore, to overcome these difficulties the conventional practice, when applying white or light color glass coatings or certain acid resistant coatings, is to add the cobalt oxide to a ground coat of bubbly-type glass which is employed to minimize the hydrogen defects. The ground coat is initially applied to the steel and fused thereon, and subsequently a second light colored or acid resistant cover coat of glass is applied over the ground coat.

In an attempt to apply a single, light colored glass coating to carbon steel, nickel coatings in the past have been galvanically or electrolytically applied to carbon steel prior to the glass coating but have not generally been successful in preventing hydrogen defects and providing the necessary adherence.

The present invention is directed to a method of bonding a glass coating to carbon steel by the use of a nickelous oxide coating that is applied to the steel prior to glassing. The nickelous oxide coating eliminates the hydrogen defects in the glass coating and substantially increases the adherence of the glass to the steel.

According to the invention, the steel base is initially cleaned by any conventional method. The cleaned steel is then coated with the lower valent form of nickel oxide, NiO known as nickelous oxide. After the nickelous oxide coating has been applied to the steel surface, a glass composition is applied over the nickelous oxide coating and the steel is then fired at an elevated temperature to fuse the glass coating to the steel.

The use of the nickelous oxide coating substantially eliminates the hydrogen defects, such as fishscaling, and reduces the amount of bubbles formed in the solidified glass. This results in a more dense coating of glass on the steel surface and a greater degree of protection for the steel.

The nickelous oxide coating promotes adherence between the glass and the steel and provides a tightly adhering glass composition which will not readily spall or flake from the steel base material. As the nickelous oxide provides the necessary adherence for the glass to the steel, single coats of white or light colored glass or certain corrosion resistant glasses can be applied directly to the steel base.

In addition, the nickelous oxide coating is applied directly to the steel base and does not require any heat treatment prior to coating with glass to oxidize the coating.

Other objects and advantages of the invention will appear in the course of the following description.

The drawing illustrates the best mode presently contemplated of carrying out the invention.

In the drawings:

Figure 1 illustrates a composite structure including a steel base 1 coated with a glass composition 2 and having an intermediate layer of NiO disposed between the glass and the steel base.

The steel base to which the nickelous oxide is applied may take the form of any ferrous material, such as relatively low carbon steel, commonly referred to as enameling iron and having a carbon content of .01% to .03%, or higher carbon steel having a carbon content up to .30%.

Figure 1:
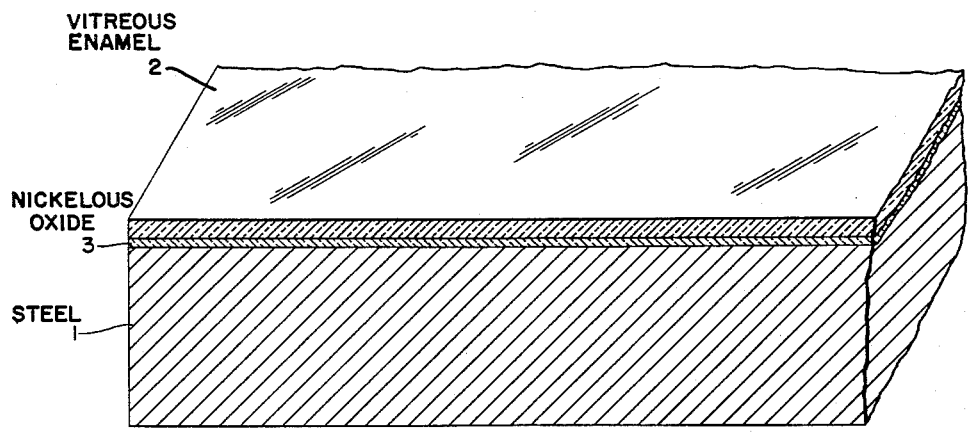
Figure 1 is a fragmentary perspective view of a glass coated steel plate having an intermediate layer of nickelous oxide.
Figure 2:
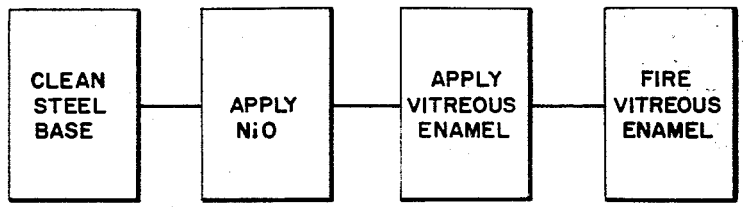
Fig. 2 is a flow sheet showing the steps in the process of the invention.

In carrying out the process of the invention as shown in Fig. 2, the steel base 1 is initially cleaned by any conventional method, such as pickling, sandblasting, grit blasting or the like.

After cleaning the steel, the coating or layer of nickelous oxide 3 is applied to the cleaned steel. It has been found that only the lower valent form of nickel oxide, NiO, when used as the coating on the steel base, provides the desired increased adherence and resistance to fishscaling. Similarly, it has been found that other compounds of nickel, such as nickel sulphate or the like, which may be applied to the steel base and subsequently oxidized to a nickel oxide do not provide the desired results.

Furthermore, while cobalt and nickel, in many cases, have similar properties and characteristics, it has been found that cobalt oxide, when applied to steel, will not function in the manner to bring about the improved results.

The nickelous oxide coating is applied to the steel in an amount in the range of 0.1 to 1.0 gram of dry nickelous oxide per square foot of steel surface. If the nickelous oxide coating is applied in an amount less than that of the above range, the action of the nickelous oxide is minimized and no appreciable results are apparent.

If the thickness of the nickelous oxide coating on the steel is above 1.0 gram per square foot of steel surface, there is a tendency for excessive boiling in the glass which results in a pitting type of defect or discoloration of a light or white colored glass subsequently applied to the coated steel.

The nickelous oxide coating can be applied in any convenient way to the steel surface so as to obtain the above mentioned concentration or thickness of dry NiO on the steel surface. It has been found that an aqueous spray is a convenient method of applying the nickelous oxide to the steel surface. In this regard, an aqueous suspension which can satisfactorily be sprayed onto the steel surface has the following compositional range in weight percent:

| | Percent |
|---|---|
| Nickelous oxide (NiO) | 5 to 30 |
| Silica ($SiO_2$) | 0 to 40 |
| Bentonite | 0 to 10 |
| Sodium carbonate ($Na_2CO_3$) | 0 to 1 |
| Sodium nitrite ($NaNO_2$) | 0 to 1 |
| Water | Balance |

A specific composition of an aqueous spray falling within the above compositional range is as follows in weight percent:

| | Percent |
|---|---|
| Nickelous oxide (NiO) | 6.4 |
| Silica (SiO$_2$) | 6.4 |
| Bentonite | 1.2 |
| Sodium carbonate | 0.5 |
| Sodium nitrite | 0.1 |
| Water | 85.4 |

The silica employed in the above aqueous suspension is an inner diluting material or filler which helps distribute the nickelous oxide and aids in the suspension. The bentonite is a form of clay which is a conventional suspending agent which tends to maintain the nickelous oxide in suspension within the water. The sodium carbonate and sodium nitrite serve as rust inhibitors.

The mill additions, such as the filler, suspending agent and rust inhibitors do not, in any way, take part in the chemical reaction occurring during the firing operation or in any way affect the characteristics or properties of the glass coating applied to the steel. It is desirable, however, when employing a filler or suspending agent, to use one that has a minimum of chemically combined water which will dissociate at elevated temperatures to form nascent hydrogen in the glass-steel fusion reaction.

The nickelous oxide and the mill additions should have a particle size finer than 200 mesh to prevent excessive localized concentrations of discrete particles of nickelous oxide. If the concentration of nickelous oxide is too high due to large particle sizes, glass defects, such as pitting, will occur. It has been found that a particle size of the nickelous oxide and the mill additions in which 97% passes through a 325 mesh sieve will provide very satisfactory results.

If the nickelous oxide coating is applied to the steel as an aqueous suspension by spraying, dipping, slushing or the like, the coating is then dried, preferably by heating the steel to a temperature in the range of 100° to 400° F. If the nickelous oxide is dry dusted onto the steel no drying operation is employed.

After the nickelous oxide coating has been dried, a layer of the glass composition 2 is applied to the coated steel. The glass composition may take the form of any of the conventional glasses or vitreous enamels normally applied to steel bases. The glass coating is then fired at an elevated temperature in the range of 1000° F. to 1600° F. to fuse the glass to the steel.

*Example 1*

A 12 inch by 12 inch SAE 1020 steel plate having a thickness of 0.008 inch was pickled in a 7% aqueous solution of sulphuric acid at 140° F. for six minutes. After pickling, the plate was rinsed in water and then dipped in a dilute alkali solution containing sodium carbonate and borax to delay rusting.

An aqueous suspension having the following composition in weight percent was then sprayed on the pickled steel plate:

| | Percent |
|---|---|
| NiO | 7.0 |
| SiO$_2$ | 6.0 |
| Bentonite | 1.0 |
| NaCO$_3$ | .5 |
| NaNO$_2$ | 0.1 |
| Water | Balance |

The sprayed plate was then dried for four minutes under infra-red lamps at a temperature of 200° F. and the resulting dried plate had a concentration of 0.48 gram of NiO per square foot of steel surface.

A glass frit having the following composition in weight percent was then applied to the coated steel by spraying.

| | Percent |
|---|---|
| Silica | 56.0 |
| Feldspar | 15.0 |
| Borax | 12.0 |
| Soda ash | 7.0 |
| Sodium nitrate | 5.0 |
| Fluorspar | 5.0 |

The glass coated steel was then fired at a temperature of 1580° F. for a period of eight minutes to fuse the glass to the steel. The resulting glass coated steel was free of fishscaling and boiling defects and the glass had excellent adherence to the steel.

*Example 2*

A 12 inch by 12 inch SAE 1020 steel plate having a thickness of 0.008 inch was sandblasted and thereafter sprayed with a coating of the nickelous oxide suspension set forth in Example 1.

After the coating was dried in a manner similar to Example 1, a glass frit having the following composition in weight percent was applied to the coated steel by dipping:

| | Percent |
|---|---|
| Sodium silica fluoride | 7.5 |
| Dehydrated borax | 21.3 |
| Potassium nitrate | 9.2 |
| Boric acid | 5.8 |
| Silica | 38.8 |
| Titanium dioxide | 17.4 |

The glass coated steel was then fired in the manner set forth in Example 1 and the resulting glass coating was free of fishscaling and hydrogen defects as well as having excellent adherence to the steel base even though no adherence promting oxides, such as cobalt oxide, were employed in the glass.

In bringing about the substantial reduction of fishscaling, it is believed that the nickelous oxide coating acts to impede the progress of atomic hydrogen into the steel during firing of the glass. During firing of the glass directly to steel at an elevated temperature, water or moisture from a number of sources reacts with the steel in the following manner:

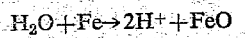

$$H_2O + Fe \rightarrow 2H^+ + FeO$$

The atomic hydrogen formed by the above reaction penetrates into the steel and after firing and as the glass coated steel is cooled, the hydrogen being less soluble in the cooler steel is discharged from the steel and builds up a pressure beneath the solidified coating with the result that the coating pops off in small flecks known as fishscales.

However, with the use of the nickelous oxide coating, it is believed that the water reacts with the nickelous oxide during firing.

The atomic hydrogen developed by the reaction is produced within the nickelous oxide coating away from the steel surface. The atomic hydrogen, rather than penetrating into the steel, will combine to form molecular hydrogen which will not penetrate into the steel. The nickelous oxide coating is porous and is believed to impede or resist the progress of the atomic hydrogen so that the atomic hydrogen will combine into molecular hydrogen rather than penetrating into the steel.

As a considerable lesser amount of hydrogen penetrates into the steel when a nickelous oxide coating is applied thereto, a correspondingly lesser amount of fishscaling will occur in the glass coating.

The nickelous oxide coating provides a very tightly adhering coating of glass bonded onto the steel base. The use of nickelous oxide eliminates the use of adherence promoting oxides, such as cobalt oxide, in the glass composition thereby permitting light or white glasses or cobalt free glasses to be applied directly to the steel base in a single coat.

Various modes of carrying out the invention are contemplated as being within the scope of the following claims particularly pointing out and distinctly claiming the subject matter which is regarded as the invention.

I claim:

1. A method of applying a vitreous enamel coating to a steel base to eliminate hydrogen defects in the enamel coating and promote adherence between the enamel and the steel, comprising spraying an aqueous suspension of nickelous oxide directly on the steel base with the size of the particles of the nickelous oxide in said suspension being finer than 200 mesh to provide for dispersion of said particles throughout the aqueous suspension, driving the nickelous oxide coating on the steel base, applying a vitreous enamel composition to the coated steel base, and firing the steel base at an elevated temperature to fuse the vitreous enamel composition to the steel with the dispersed particles of nickelous oxide providing a substantial surface area reacting with the hydrogen produced during firing.

2. A method of vitreous enamel coating a steel base, comprising cleaning the steel base, coating the steel base with an aqueous suspension of nickelous oxide with the nickelous oxide being applied to the steel in an amount of 0.1 to 1.0 gram of dry nickelous oxide per square foot of the steel surface, drying the aqueous suspension on the steel base to provide a layer of discrete fine particles of nickelous oxide thereon, applying a light color vitreous enamel frit composition directly to the coated steel, and firing the steel at an elevated temperature to fuse the vitreous enamel to the steel base.

3. A method of vitreous enamel coating a ferrous material, which comprises cleaning the ferrous material, applying a layer of discrete fine particles of NiO directly to the cleaned material, applying a vitreous enamel frit to the ferrous material over the layer of NiO particles, and firing the material at an elevated temperature to fuse the vitreous enamel to the ferrous material, said layer of NiO particles providing a substantial amount of surface area reacting with the hydrogen developed during firing to prevent fishscaling and promote adherence of said vitreous enamel to the ferrous material.

4. A method of vitreous enamel coating steel having a carbon content up to .30%, comprising cleaning the steel, applying a layer of discrete fine particles of nickelous oxide directly to the cleaned steel, applying a vitreous enamel composition substantially free of adherence promoting oxides to the steel over said layer of nickelous oxide particles, and firing the steel at an elevated temperature to fuse the vitreous enamel to the steel, said layer of discrete nickelous oxide particles providing a substantial amount of surface area and reacting with the hydrogen developed during firing to prevent fishscaling and promote adherence of said vitreous enamel to the steel.

5. A method of vitreous enamel coating steel to eliminate fish scaling defects in the vitreous enamel coating, comprising applying a layer of discrete fine particles of NiO to the steel in an amount in the range of 0.1 to 1.0 gram of dry NiO per square foot of steel surface and with the size of the particles of NiO being finer than 200 mesh to prevent excessive localized concentration of nickelous oxide, applying an enamel frit composition to the steel over the layer of NiO, and firing the steel at an elevated temperature to fuse the vitreous enamel to the steel.

References Cited in the file of this patent

UNITED STATES PATENTS

| | | |
|---|---|---|
| 1,805,143 | Hommel | May 12, 1931 |
| 2,010,145 | Eitel | Aug. 6, 1935 |
| 2,193,640 | Navias | Mar. 12, 1940 |
| 2,244,360 | Gallup | June 3, 1941 |
| 2,581,310 | Sweo | Jan. 1, 1952 |
| 2,722,085 | De Gier et al. | Nov. 1, 1955 |
| 2,755,210 | Sutphen et al. | July 17, 1956 |

FOREIGN PATENTS

| | | |
|---|---|---|
| 476,602 | Great Britain | Dec. 8, 1937 |

UNITED STATES PATENT OFFICE
CERTIFICATE OF CORRECTION

Patent No. 2,940,865            June 14, 1960

James D. Sullivan

It is hereby certified that error appears in the printed specification of the above numbered patent requiring correction and that the said Letters Patent should read as corrected below.

Column 5, line 14, for "driving" read -- drying --.

Signed and sealed this 4th day of April 1961.

(SEAL)

Attest:    ERNEST W. SWIDER

Attesting Officer                              ARTHUR W. CROCKER
                                                    Acting Commissioner of Patents